United States Patent [19]

Igarashi

[11] Patent Number: 4,682,042

[45] Date of Patent: Jul. 21, 1987

[54] INFORMATION READING DEVICE WITH DRIVER CIRCUITRY SEPARATE FROM SENSOR BOARD

[75] Inventor: Yosuke Igarashi, Yokohama, Japan

[73] Assignee: Kabushiki Kaisha Toshiba, Kawasaki, Japan

[21] Appl. No.: 788,836

[22] Filed: Oct. 18, 1985

[30] Foreign Application Priority Data

Oct. 30, 1984 [JP] Japan .................... 59-228505

[51] Int. Cl.⁴ .......................................... H01J 40/14
[52] U.S. Cl. .................................. 250/578; 358/293
[58] Field of Search ...................... 250/234–235, 250/578; 358/293–294, 213

[56] References Cited

U.S. PATENT DOCUMENTS 4,471,384 9/1984 Sato et al. .................. 358/293 X

FOREIGN PATENT DOCUMENTS 0091798 10/1983 European Pat. Off. .

Primary Examiner—Eugene R. LaRoche
Assistant Examiner—David Mis
Attorney, Agent, or Firm—Finnegan, Henderson, Farabow, Garrett & Dunner

[57] ABSTRACT

An information reading device comprises an original table on which is placed an original to be scanned, a scanner, and a carriage driving mechanism for reciprocally moving the scanner along the original table. The scanner comprises a carriage, a light source supported on the carriage to irradiate the original placed on the table, a rod lens array supported on the carriage for leading the reflected light from the original, a sensor board supported on the carriage, an image sensor attached to the sensor board to convert the light led by the rod lens array to electrical signals, a driver board supported on the carriage near but separate from the sensor board, and a driving circuit incorporated in the driver board and electrically connected to the image sensor to drive the image sensor.

21 Claims, 9 Drawing Figures

INFORMATION READING DEVICE WITH DRIVER CIRCUITRY SEPARATE FROM SENSOR BOARD

BACKGROUND OF THE INVENTION

The present invention relates to an information reading device which is applied to image forming devices such as thermal ink-transfer color copying machines.

Recently, thermal ink-transfer color copying machines which perform color copying using, for example, thermal ink-transfer ribbon of a plurality of colors have been developed. These color copying machines are generally constructed to comprise an information reading device to read an original and an image forming device which transfers and forms the image information read out by the information reading device on a sheet of paper. That is, the information reading device reads the image information of the original as optical color signals by optically scanning the original which has been placed on an original table, and sends the image information thus read to the image forming device. The image forming device receives the image information from the information reading device, converts it to color information corresponding to each of the colored inks on the thermal ink-transfer ribbon, selects an ink portion of the thermal ink-transfer ribbon corresponding to this color information, and thermally transfers the ink in the selected ink portion to the sheet of paper by means of a thermal head, thus color copying the original by the transfer of the respective colored inks, one after another, onto the sheet of paper.

Conventional information reading devices used for color copying machines are typically constructed in a manner represented in FIGS. 1 and 2. On the top surface of a main body 1, an original table 2 is provided for placing and holding an original (FIG. 2). Below original table 2, a scanner 3 is disposed which optically scans the original on original table 2 by reciprocatively moving in parallel to and along the bottom surface of table 2 in the direction of the arrow A shown in FIG. 1. As shown in FIG. 2, scanner 3 comprises a pair of fluorescent lamps 4, which irradiate the original on the original table 2 with light; a pair of rod lens arrays 5, which lead the reflected light from the portion of the original located between the fluorescent lamps 4; and a charge-coupled device (CCD) image sensor unit 6 which receives the light led by rod lens arrays 5 and converts the light to electrical signals. Each of these units are individually supported by a carriage 7. At the side of carriage 7, a container box 8 is mounted integrally with carriage 7. Inside of container box 8, three printed circuit boards 9 are vertically mounted which include an amplifying circuit to amplify the signal from CCD image sensor unit 6 and an A/D conversion circuit which converts the amplified signals to digital signals. The signals outputted from printed circuit boards 9 are transferred to a central processing unit (CPU) board 11 provided at the bottom of main body 1 through a flat cable 10 (FIG. 1) from which they are forwarded to external circuits.

One end of carriage 7 is slidably fitted to a guide shaft 12 disposed in the longitudinal direction of main body 1 and, at carriage 7, a wheel (not shown in the figure) is rotatably installed and is designed to travel a guide rail (not shown) arranged in parallel with guide shaft 12. A drive pulley 13 is disposed at one end of the guide shaft 12 (rear side of main body 1), and a drive pulley 14 is disposed at the other end (front side of main body 1). A timing belt 15 is extended around pulleys 13 and 14, with one point of timing belt 15 fixed to carriage 7. Drive pulley 13 is driven by a reversibly-rotatably pulse motor 16 installed in the rear portion of main body 1 and scanner 3 is reciprocally movable along and parallel to the bottom face of original table 2 in the direction of arrow A in FIG. 1 (longitudinal direction of main body 1). Near pulse motor 16, at the rear portion of main body 1, a power supply unit 17 incorporated with an inverter circuit to convert DC power to AC power is provided to supply required AC power to fluorescent lamps 4 through a flat cable 18.

The conventional information reading device as described above, however, has the following drawbacks. CCD image sensor unit 6 is constructed by incorporating a CCD line sensor (hereinafter called a CCD sensor) as a sensor element, and various circuits such as CCD sensor driving circuit, a driving power supply line, and an output signal line, on a single ceramic base board. In other words, from the view point of the accuracy requirement for mounting position and height, the CCD sensor is mounted on a very flat ceramic base board having little response to temperature variation, and, in addition, the other circuits (the driving circuit, the driving power supply line, the signal output line, etc.) are also arranged on the same ceramic base board. For the above reason, the width of the ceramic base board, which corresponds to the width of CCD image sensor unit 6, must be about 63 mm. With this construction, however, when the specification or arrangement is changed, the whole ceramic base board must be rebuilt. Furthermore, this causes a problem of producing a warp in the large ceramic base board by as much as or more than 60 mm during manufacturing. Moreover, because of the required high-speed signal transference in the driving circuit, heat is likely to be produced therein, resulting in the CCD sensor experiencing undesirable thermal noise due to the heat.

SUMMARY OF THE INVENTION

It is an object of the present invention to provide an information reading device which prevents the influence of the heat from the driving circuit portion, namely, the image sensor element does not generate thermal noise.

It is an further object of the present invention to provide an information reading device which can be easily adapted to changes in the specification or arrangement.

To achieve the above objects, an information reading device according to the present invention includes an original table on which is placed an original to be scanned, a scanner, and a carriage driving mechanism for reciprocally moving the scanner along the original table. The scanner comprises a carriage, a light source supported on the carriage to irradiate light to the original placed on the table, a rod lens array supported on the carriage for leading the reflected light from the original, a sensor board supported on the carriage, an image sensor attached to the sensor board to convert the light led by the rod lens array to electrical signals, a driver board supported on the carriage near but separate from the sensor board, and a driving circuit incorporated in the driver board and electrically connected with the image sensor to drive the image sensor.

DESCRIPTION OF THE PREFERRED EMBODIMENT

Figure 5:
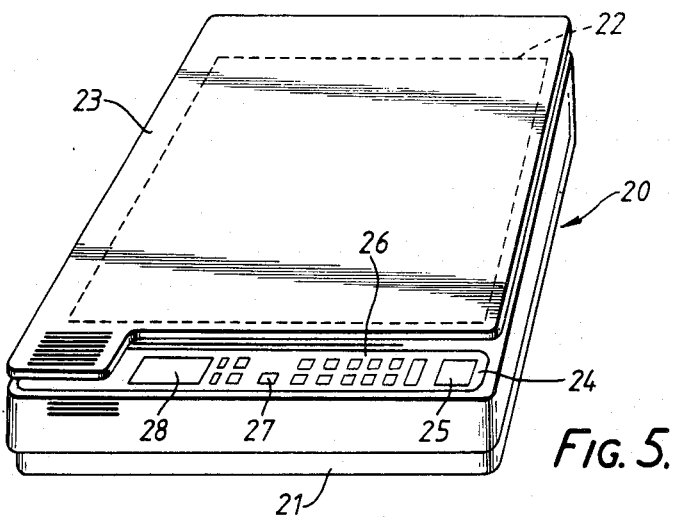
FIG. 5 is a perspective view illustrating the external appearance of the information reading device according to the present invention.
Figure 6:
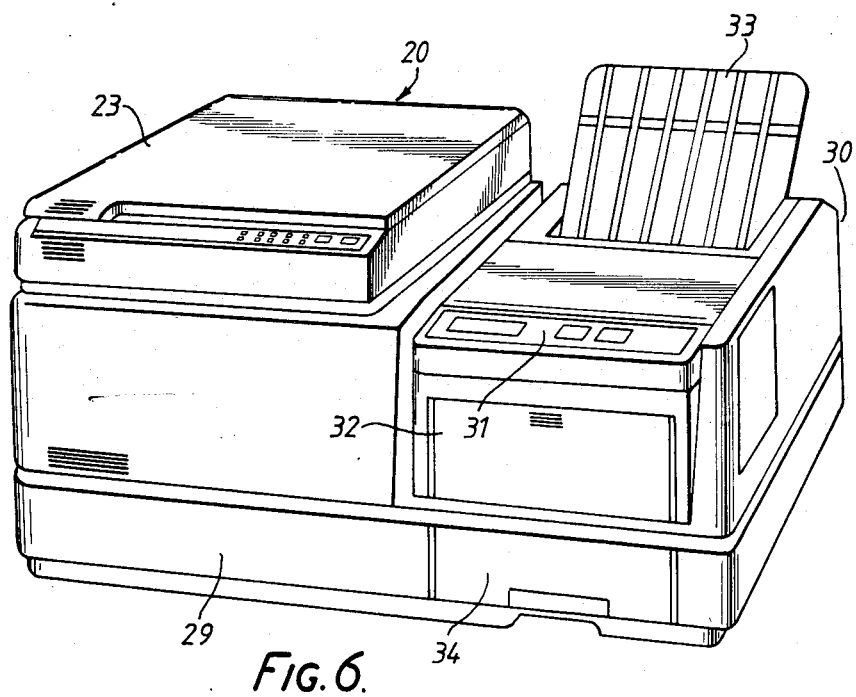
FIG. 6 is a perspective view of a thermal ink-transfer color copying machine adapted to incorporate the information reading device of the present invention.

An embodiment of the present invention will be described referring to the accompanying drawings. FIG. 5 represents the external appearance of an information reading device 20 according to this invention. FIG. 6 shows the appearance of the information reading device 20 when set on a thermal ink-transfer color copying machine. On the upper surface of a main body 21, an original table (transparent glass) 22 is provided, on which table an original is placed. A cover 23 for the original is provided on the upper surface of original table 22 so as to be freely openable and closable. Information reading device 20 is for reading the image information on the original as color signals by causing a scanner (explained later in detail) to optically scan the original placed on original table 22 by moving the scanner reciprocally along and in parallel to the lower surface of original table 22. At the front of main body 21, an operating panel 24 is provided. On operating panel 24, a copying key 25 for starting copying operation, ten keys 26 for setting the number of copying sheets, a number of sheets indicator 27 for displaying the number of copying sheets, and a copying state indication unit 28 for indicating various operating conditions are provided.

The image information outputted from the above information reading device 20 is transferred to an image forming device 30 removably mounted on the upper right side of a copying machine main body 29. In image forming device 30, the image information from information reading device 20 is converted to color information corresponding to each ink on the thermal ink-transfer ribbon. An ink portion corresponding to each color of the color information is selected on the thermal ink-transfer ribbon, and the ink on the selected ink portion is thermally transferred on a sheet of paper by means of a thermal head, thus completing the color copying by transferring colors one after another. In the front portion of image forming device 30, an operating panel 31 is provided. In the front face of image forming device 30 a manual feed tray 32 for feeding sheets of paper by hand is disposed to be freely openable and closable and, at the rear upper side, a paper discharge tray 33 is installed for discharging papers after completion of the transferring process. In addition, in copying machine main body 29 located below image forming device 30, a paper feed cassette 34 in which many sheets of paper are stored is removably mounted.

Figure 1:
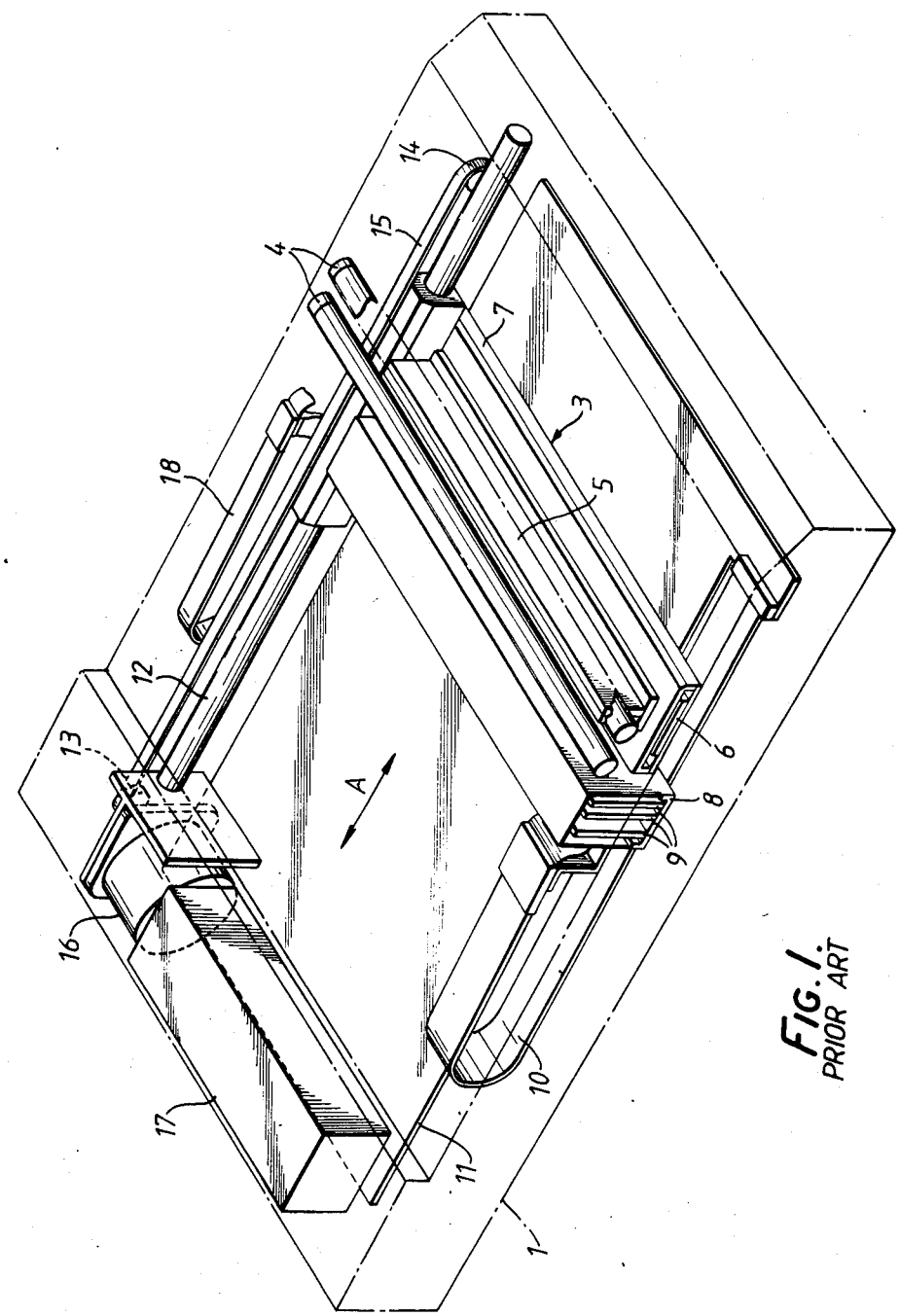
FIG. 1 is a perspective view schematically illustrating the internal construction of a conventional information reading device.
Figure 2:
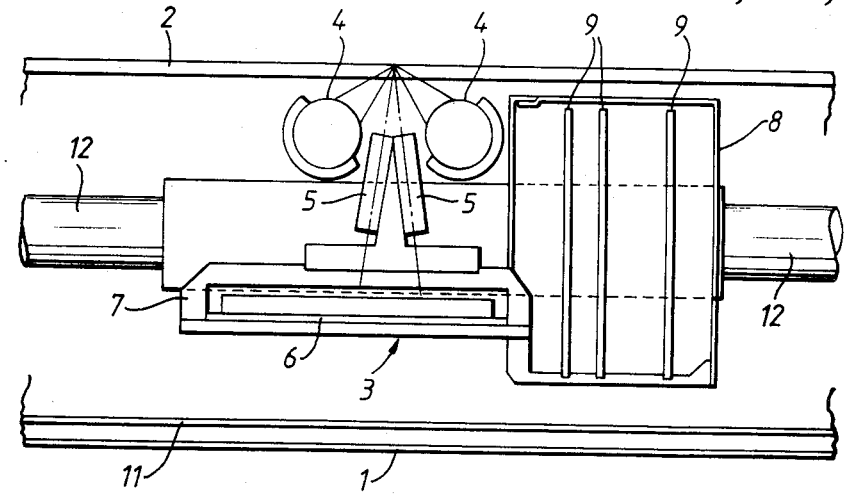
FIG. 2 is a vertical sectional side view showing the portion of the scanner of the conventional information device shown in FIG. 1 in detail.
Figure 4:
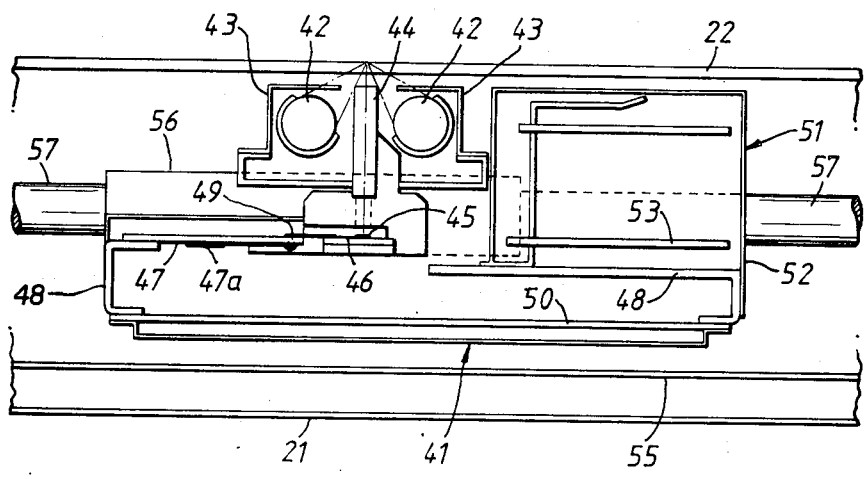
FIG. 4 is a vertical sectional side view showing the scanner section of the embodiment in FIG. 3.
Figure 3:
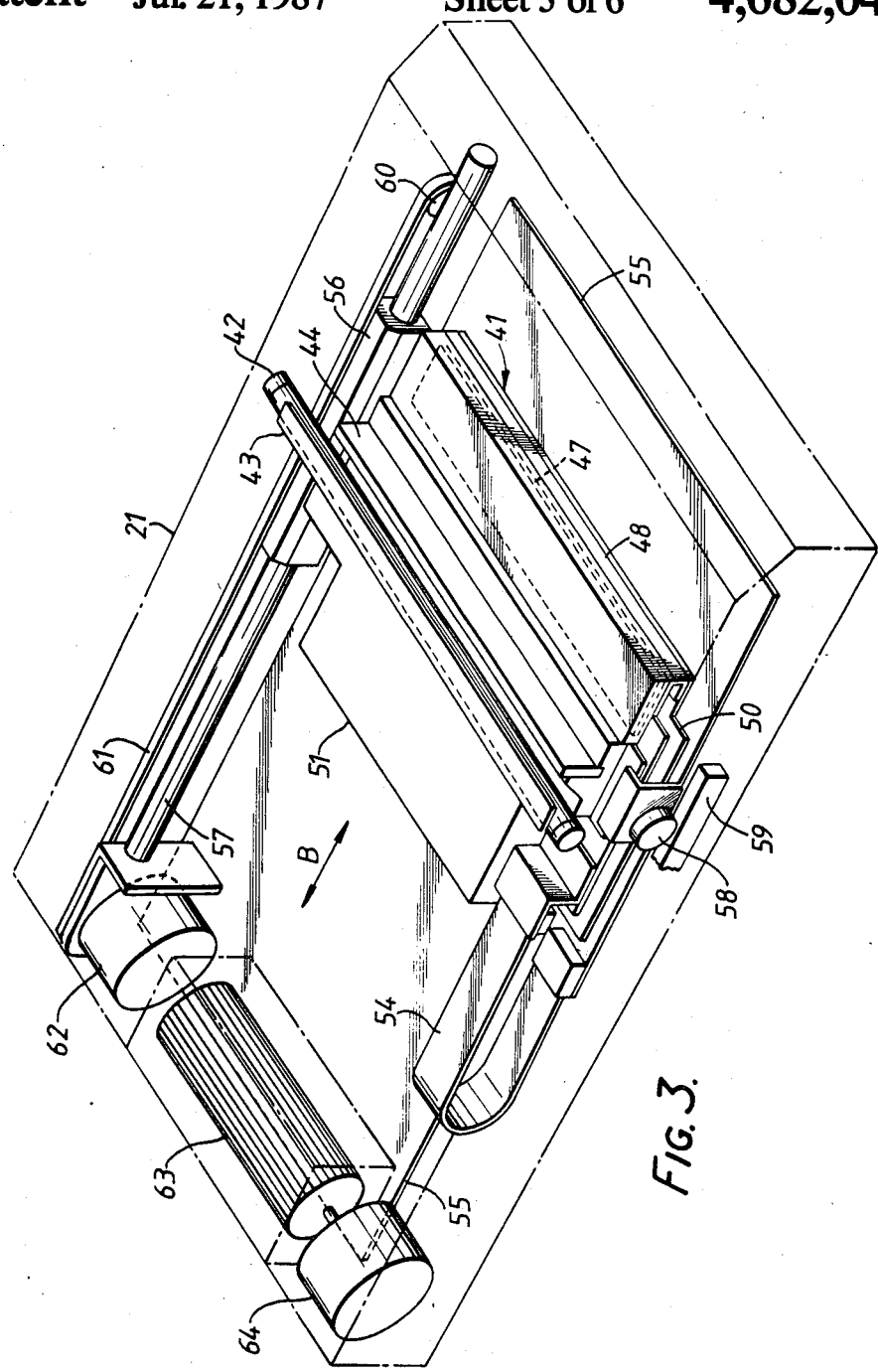
FIG. 3 is a perspective view schematically illustrating the internal construction of an information reading device according to the present invention.

FIGS. 3 and 4 illustrate the construction of the above information reading device 20. In the figures, at the lower side of original table 22, a scanner 41 is provided. Scanner 41 reciprocally moves in the direction of the arrow B shown in FIG. 3 (longitudinal direction of main body 21) along and in parallel to the lower surface of the original table 22 to optically scan the original placed on original table 22. Scanner 41, as shown in FIG. 4. in detail, comprises a pair of fluorescent lamps 42 to serve as a light source to irradiate the original on original table 22; a stray light shielding plate 43 provided around fluorescent lamps 42; a rod lens array 44 which is vertically placed between fluorescent lamps 42 and leads the reflected light from the original below original table 22; a CCD image sensor (CCD sensor chip) 45 to serve as an image sensor element, which receives the light led by rod lens array 44 and converts it to electric signals; a sensor board (ceramic base board) 46 to which CCD image sensor 45 is attached; and a driver board 47 which is arranged near but separate from sensor board 46 (left side of sensor board 46 in FIG. 4) and to which a driving circuit 47a to drive CCD image sensor 45 is incorporated. A driving power supply line and signal output line are printed on the driver board to electrically connect CCD image sensor 45. These components are individually supported on a carriage 48 through respective supporting members. Sensor board 46 and driver board 47 are horizontally arranged. The mounting surface of CCD image sensor 45 is arranged on sensor board 46, and the mounting surfaces of electric elements (i.e., driving circuit, driving power supply line, and signal output line) are mounted on driver board 47 and are on the respective board faces which are opposite of each other. Sensor board 46 and driver board 47 are electrically connected by soldering and with a conductive pin 49. Carriage 48 is constructed in a hollow shape, and in the hollow portion a signal processing printed circuit board 50 is horizontally mounted. Signal processing printed circuit board 50 contains an amplifying circuit to amplify the output signal from CCD image sensor 45 and an A/D conversion circuit to convert the amplified signals to digital signals. On carriage 48, a power supply unit 51 which supplies AC power to fluorescent lamps 42 is provided at the rear side of main body 21. As shown in FIG. 4, power supply unit 51 comprises a container box 52 integrated to carriage 48, and an inverter printed circuit board 53 horizontally contained in container box 52. In inverter printed circuit board 53, an inverter circuit which converts DC power (such as 24 V DC) to AC power (such as 400 V AC) is incorporated. A signal output from signal processing printed circuit board 50 is transferred to a CPU board 55 provided at the bottom the main body 21 through a flat cable 54 (FIG. 3) is then transferred to image forming device 30. Inverter printed circuit board 53 in power supply unit 51 receives DC power (24 V DC) also through flat cable 54. CPU board 55 incorporates a driving circuit for a pulse motor 62; a line memory; a timing circuit and a high-speed clock circuit for controlling the signal reading; a CPU which carries out overall control; and their peripheral circuits. By these components, the overall control of the reading device, such as operation of mechanisms, read and transfer of signals, adjustment of light of the fluorescent lamps 42, shading correction, and indication of trouble, are carried out.

Carriage 48 is provided with a guide shaft 57 slidably fitted at one end in the longitudinal direction of main body 21 through a slider 56. A wheel 58 rotatably fitted at the other end of guide shaft 57, with wheel 58 arranged in parallel to guide shaft 57 and adapted to run on a guide rail 59. Guide shaft 57 has a drive pulley (not shown in the figures) at one end (the rear side of main body 21) and a driven pulley 60 at the other end (the front side of main body 21). A timing belt 61 extends around the drive pulley and driven pulley 60, with one point of timing belt 61 fixed to the carriage 48 by a fixing member (not shown in the figures). The drive pulley is driven by a pulse motor 62 which is reversibly rotatable and installed at the rear side of main body 21. The normal or reverse rotation of pulse motor 62 causes the carriage 48 (scanner 41) to move reciprocally in the direction of the arrow B in FIG. 3 (longitudinal direction of main body 21) along and in parallel to the lower surface of original table 22 to read the original on original table 22. A cooling fan 63 is installed near pulse motor 62 internally and at the rear of main body 21, and performs cooling within main body 21 by suction. In this case, the cooling air flows from the front side to the rear side and cools, in particular, driver board 47 and signal processing printed circuit board 50. Cooling fan 63 is driven by a DC brushless motor 64.

Figure 7:
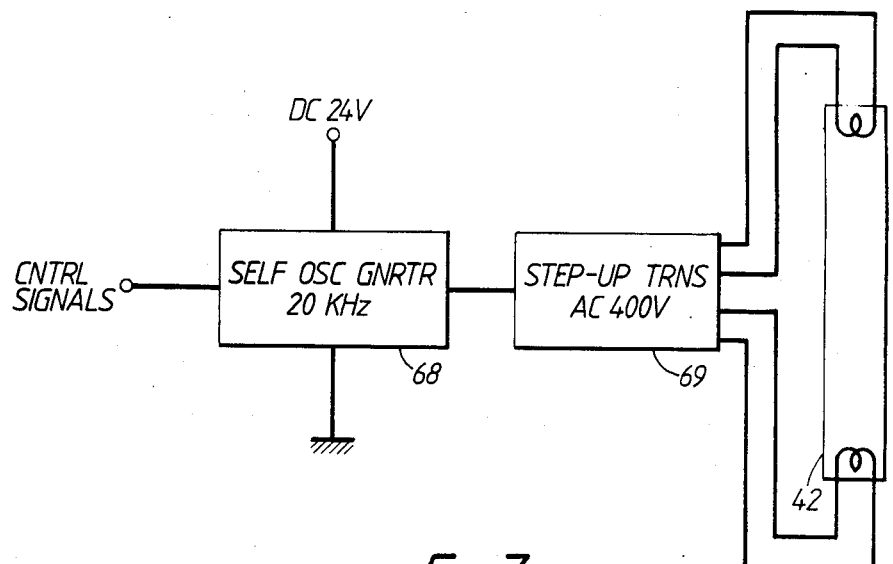
FIG. 7 is a schematic block diagram of an inverter circuit used in a power supply unit of the information reading device of the present invention.

FIG. 7 shows the inverter circuit incorporated in inverter printed circuit board 53. It comprises a self-oscillating generator 68 which is energized by, for example, 24 V DC and outputs AC signals of approximately 20 kHz, and a step-up transformer 69 which steps up the output of self-oscillating generator 68 to 400 V AC and supplies the power to fluorescent lamps 42. Control signals are inputted to self-oscillating generator 68 to control the amount of light from fluorescent lamps 42 by controlling the tube current or the tube voltage applied to fluorescent lamps 42.

Figure 8:
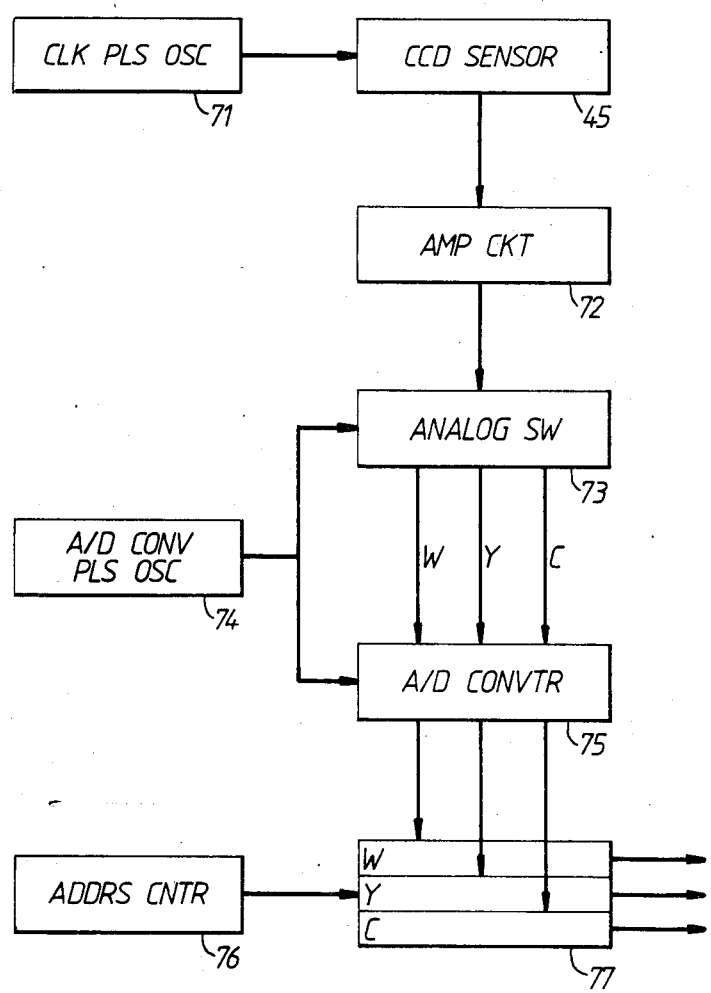
FIG. 8 is a block diagram showing a signal processing circuit to process CCD sensor output signals of the information reading device of the present invention.

FIG. 8 represents a signal processing circuit diagram for processing the output signals from CCD image sensor 45. The signal processing circuit separates the image information for a line read out by CCD image sensor 45 into the color information of white (W), yellow (Y), and cyan (C), and stores this information to buffer memory areas corresponding to each color. It comprises a clock pulse oscillator 71, an amplifying circuit 72, an analog switch 73, an A/D conversion pulse oscillator 74, an A/D converter 75, an address counter 76, and a buffer memory 77. The analog signals taken out in serial order from CCD image sensor 46 corresponding to the clock pulse outputted from clock pulse oscillator 71 are amplified by amplifier circuit 72. The signals amplified by amplifying circuit 72 are separated into color information corresponding to each color of white (W), yellow (Y), and cyan (C) by analog switch 73, which works in accordance with the A/D conversion pulse from A/D conversion pulse oscillator 74, and the results are sent to A/D converter 75. A/D converter 75 is operated by the A/D conversion pulse from A/D conversion pulse oscillator 74. It converts each signal from analog switch 73 to a digital signal and sends it to the appropriate area in buffer memory 77, which stores the digitized signal from A/D converter 75 to the address shown by address counter 76. In this manner, the color information for one line read out by CCD image sensor 45 is converted to digital signals and the color information for each color is stored in the corresponding color area in buffer memory 77. The color information stored in buffer memory 77 is transferred to image forming device 30 according to specified timing.

In the construction of the components as explained above, CCD image sensor 45 and its driving circit are separately located. The incorporation of CCD image sensor 45 on sensor baord 46, and of the driving circuit on driver board 45, facilitates selection of the mounting angle between sensor board 46 and driver board 47, the orientation of the light receiving sensor surface, and of the orientation of component surfaces in many ways, which allows these components to be most suitably arranged to conform to the particular application. In addition, since driver board 47 is independent, if it is provided for each specification and device model, CCD image sensor 45 can be commonly used for various applications, which reduces the cost of CCD image sensor 45 and improves its reliability. Furthermore, as CCD image sensor 45 and driver board 47 are separately manufactured, their overall yield rates are improved. Although high-speed transfer (for example, approx. 20 kHz) of signals on driver board 47 causes a significant heat generating problem for elements such as integrated circuits (ICs), independent arrangement of CCD image sensor 45 on a separate board (sensor board 46) limits the conduction of heat from ICs or the like to CCD image sensor 45 and protects CCD image sensor 45 from the heat. On the other hand, the independence of driver board 47 facilitates simple cooling of the elements such as IC's on driver board 47.

Figure 9:
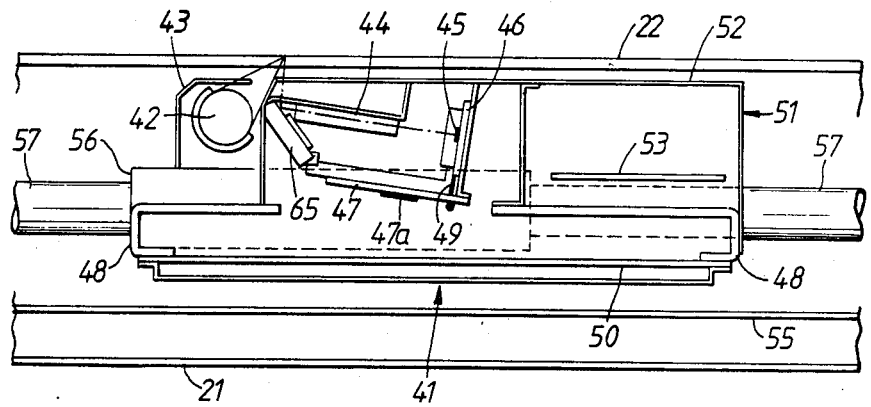
FIG. 9 is a vertical sectional side view showing a scanner section of another embodiment of the present invention.

FIG. 9 represents another embodiment of scanner 41 which differs from above embodiment (FIG. 4) in turning rod lens array 44 sideways. It is identical in other respects so that the same elements are marked with the same numerals and the explanation for them is omitted. In FIG. 9, the reflected light from the original is directed below original table 22 and is again reflected sideways (the right direction in FIG. 9) by a mirror 65. The light reflected from mirror 65 is led sideways by rod lens array 44 disposed sideways and enters CCD image sensor 45. In this case sensor board 46, which supports CCD image sensor 45, is arranged almost vertically, and driver board 47 is arranged almost horizontally. In other words, sensor board 46 and driver board 47 are arranged perpendicularly to each other. Such arrangement is particularly effective in making the main body 21 thin.

Although in the above embodiments, the scanner 41 is applied to an information reading device to read image information on an original in a thermal ink-transfer color copying machine, it is to be understood that the invention is not limited to such application. For example, the unit can be applied to an information reading device to read image information in an electrophotography-type laser beam printer, or to information reading devices to read information in other equipment.

What is claimed is:

1. An information reading device for reading information from an original document, said device comprising:

a main body member having an inner bottom surface;

an original table member mounted on said main body member and having a surface spaced from and substantially parallel to said inner bottom surface to support an original document to be scanned;

a carriage member mounted on said main body member and movable reciprocally in a plane substantially parallel to said original table member surface;

carriage driving means for reciprocally moving said carriage member;

a scanner mounted on said carriage member, said scanner including,
 a light source disposed to irradiate light onto the original document positioned on said table member surface during reciprocal movement of said carriage member, and
 light leading means positioned to guide said irradiated light reflected from the original document to a selected location;

a sensor board having image sensing means on one surface thereof, said sensor board being mounted on said carriage member and disposed to position said image sensing means at said selected location for receiving said irradiated reflected light from said light leading means and for converting said irradiated reflected light into electrical signals;

a driver board mounted on said carriage member adjacent to but spaced from said sensor board, said driver board having driving circuitry for driving said image sensing means incorporated into one surface of said driver board; and means for electrically connecting said image sensing means and said driving circuitry.

2. An information reading device according to claim 1, wherein the image sensing means comprises a charge coupled device (CCD).

3. An information reading device according to claim 1, wherein:
 the sensor board and the driver board are disposed substantially parallel to the table member surface; and
 the one surface of said sensor board and the one surface of said driver board are disposed to face outwardly and away from each other in opposite directions.

4. An information reading device according to claim 1, wherein the electrical connecting means comprises a conductive pin.

5. An information reading device according to claim 1, wherein the light leading means comprises a rod lens array.

6. An information reading device according to claim 1, further comprising a signal processing board mounted on the carriage member and spaced from the sensor board, said signal processing board including an amplifying circuit to amplify the electrical signals from the image sensing means and an A/D conversion circuit to convert said electrical signals to digital signals.

7. An information reading device according to claim 1, further comprising power supply means mounted on the carriage member and spaced from the sensor board for supplying electric power to the light source.

8. An information reading device according to claim 7, wherein the power supply means comprises a container box spaced from the sensor board and an inverter circuit board contained in said container box, said inverter circuit board incorporating an inverter circuit for converting DC power to AC power.

9. An information reading device according to claim 1, wherein:
 the one surface of the sensor board extends approximately perpendicularly to the table member surface;
 the one surface of the driver board is disposed approximately perpendicularly to said one surface of said sensor board; and
 the reading device further comprises a mirror mounted on said carriage to reflect the irradiated light from the original document to the light leading means, said light leading means being disposed to receive said irradiated reflected light from said mirror and direct said irradiated reflected light to the image sensing means.

10. An information reading device according to claim 9, wherein the one surface of the driver board faces away from the one surface of the sensor board.

11. An information reading device according to claim 1, further comprising a central processing unit (CPU) board mounted in the main body member and having a driving circuitry for driving the carriage driving means, a line memory, timing circuitry and clock means for controlling signal reading, and central processing unit circuitry.

12. An information reading device according to claim 3, further comprising air circulation means mounted on the main body member and disposed to direct cooling air across the sensor board and the driver board.

13. An information reading device for reading information from an original document, said device comprising:
 a main body member having an inner bottom surface;
 an original table member mounted on said main body member and having a surface spaced from and substantially parallel to said inner bottom surface to support an original document to be scanned;
 a carriage member mounted on said main body member and movable reciprocally in a plane substantially parallel to said original table member surface;
 carriage driving means for reciprocally moving said carriage member;
 a scanner mounted on said carriage member, said scanner including,
  a light source disposed to irradiate light onto the original document positioned on said table member surface during reciprocal movement of said carriage member, and
  light leading means positioned to guide said irradiated light reflected from the original document to a selected location;
 a sensor board having image sensing means on one surface thereof, said sensor board being mounted on said carriage member and disposed to position said image sensing means at said selected location for receiving said irradiated reflected light from said light leading means and for converting said irradiated reflected light into electrical signals;
 a driver board mounted on said carriage member adjacent to but spaced from said sensor board, said driver board having driving circuitry for driving said image sensing means incorporated into one surface of said driver board;
 means for electrically connecting said image sensing means and said driving circuitry; and
 a signal processing board mounted on said carriage member and spaced from said sensor board for processing said electrical signals from said image sensing means.

14. An information reading device according to claim 13, wherein:
the sensor board and the driver board are disposed substantially parallel to the table member surface; and
the one surface of said sensor board and the one surface of said driver board are disposed to face outwardly and away from each other in opposite directions.

15. An information reading device according to claim 13, wherein the electrical connecting means comprises a conductive pin.

16. An information reading device according to claim 13, further comprising power supply means mounted on the carriage member and spaced from the sensor board for supplying electrical power to the light source.

17. An information reading device according to claim 16, wherein the power supply means comprises a container box spaced from the sensor board and an inverter circuit board contained in said container box, said inverter circuit board incorporating an inverter circuit for converting DC power to AC power.

18. An information reading device according to claim 14, further comprising air circulation means mounted on the main body member and disposed to direct cooling air across the sensor board and the driver board.

19. An information reading device for reading information from an original document, said device comprising:
a main body member having an inner bottom surface;
an original table member on said main body member and having a surface spaced from and substantially parallel to said inner bottom surface to support an original document to be scanned;
a carriage member mounted on said main body member and movable reciprocally in a plane substantially parallel to said original table member surface;
carriage driving means for reciprocally moving said carriage member;
a scanner mounted on said carriage member, said scanner including,
a light source disposed to irradiate light onto the original document positioned on said table member surface during reciprocal movement of said carriage member, and
light leading means positioned to guide said irradiated light reflected from the original document to a selected location;
a sensor board having image sensing means on one surface thereof, said sensor board being mounted on said carriage and disposed to position said image sensing means at said selected location for receiving said irradiated reflected light from said light leading means and for convertng said irrradiated reflected light into electrical signals;
a driver board mounted on said carriage member adjacent to but spaced from said sensor board, said driver board having driving circuitry for driving said image sensing means incorporated into one surface of said driver board;
means for electrically connecting said image sensing means and said driving circuitry;
a signal processing board mounted on said carriage member and spaced from said driver board for processing said electrical signals from said image sensing means;
an inverter circuit board incorporating an inverter circuit for converting DC power to AC power; and
air circulation means mounted on the main body member and disposed to direct cooling air across said driver board, sensor board, signal processng board, and inverter circuit board.

20. An information reading device according to claim 19, wherein:
the sensor board and the driver board are disposed substantially parallel to the table member surface; and
the one surface of said sensor board and the one surface of said driver board are disposed to face outwardly and away from each other in opposite directions.

21. An information reading device according to claim 19, wherein the electrical connecting means comprises a conductive pin.

* * * * *